July 22, 1958 — S. M. MERCIER — 2,844,042

CHAIN

Filed Oct. 27, 1953

INVENTOR;
STANLEY M. MERCIER,
BY
ATT'Y.

United States Patent Office 2,844,042
Patented July 22, 1958

2,844,042

CHAIN

Stanley M. Mercier, Bexley, Ohio, assignor to The Jeffrey Manufacturing Company, a corporation of Ohio Application October 27, 1953, Serial No. 388,559

7 Claims. (Cl. 74—245)

This invention relates to chain and particularly to improved construction in chain which provides for maximum strength for given amounts of material in the links thereof.

One object of the invention is therefore to provide improved chain construction having a maximum strength for any given amount of material in the elements of the chain.

Another object of the invention is to provide an improved chain link including spaced opposite side strap elements or the side strap elements per se, wherein the strength of the side strap elements is maintained adjacent the chain pin bores therein by rings or pads which are made integral with the side strap elements, they being welded or otherwise fused therein.

Another object of the invention is to provide improved chain or chain link construction having a maximum strength for any given amount of material in the chain links wherein the links are of fabricated construction and in which elements that cooperate to form the body of each link are welded or otherwise fused into an integral unit, and these various elements are made of metals or alloys thereof which cooperate to provide for maximum strength in the links.

Still another object of the invention is to carry out the above objects while providing a chain of still further improved construction which is particularly adapted to operate at elevated temperatures, in which the chain knuckle bushings have hot press fits in the chain knuckles at elevated temperatures and shrink fit therein when the chain is at ambient temperature and wherein improved construction may be provided whereby rotation and/or axial movement of the knuckle pins is prevented when the chain is operating at elevated temperatures.

Other objects of the invention will appear hereinafter, the novel features and combinations being set forth in the appended claims.

Figures 3, 4:
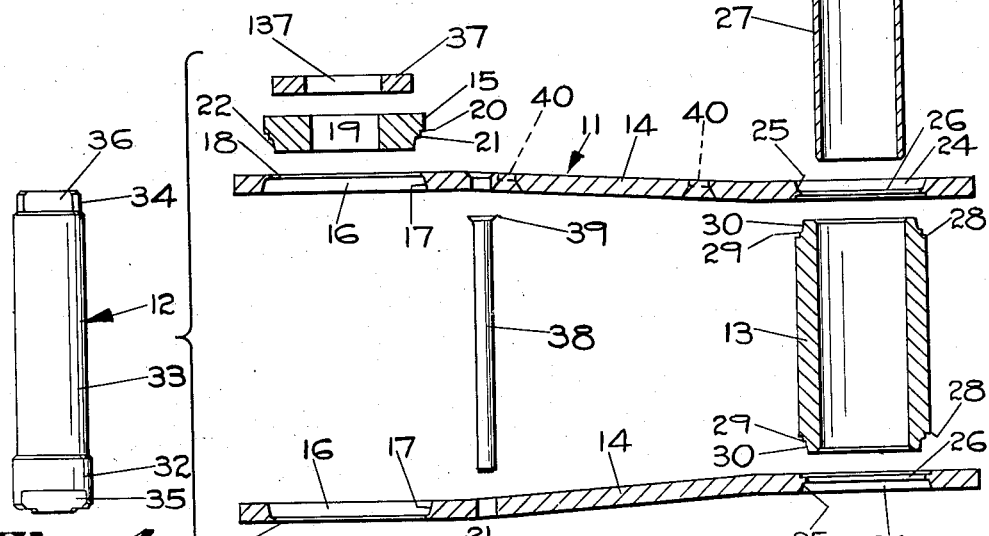
Fig. 3 is an exploded view in section of the elements which when assembled and welded or otherwise fused together form one of the links of the chain seen in Fig. 1.
Figs. 4 and 5 are elevational and end views, respectively, of a knuckle pin of the chain seen in Fig. 1 of the drawings.
Figures 5, 7:
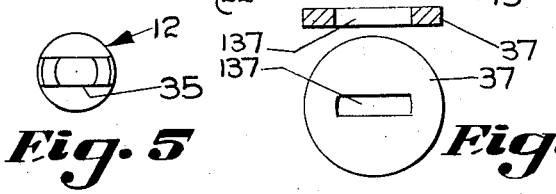
Fig. 7 is a view in plan of one of the chain knuckle pin keepers.

The chain 10 shown in the drawings includes a plurality of chain links 11 which are identical in construction and which are secured together to form the chain 10 by a plurality of knuckle pins 12. Because the links 11 of chain 10 are identical, the construction of chain 10 can best be seen when the structure of one of the chain links 11 is understood. Referring particularly to Fig. 3 of the drawings wherein elements which cooperate to form one of the chain links 11 are shown in detail, the fabricated chain link body includes a knuckle or thimble element 13 and a pair of spaced side bar or strap elements 14 which in the finished link are fused with knuckle or thimble 13 to provide an integral chain link body unit.

Each of the side bar or strap elements 14 may be considered as a sub-assembly to be incorporated into the finished chain link body because it includes at one of its ends a laterally extending knuckle pin receiving ring or pad 15 which in the finished side bar or strap element is a permanent part of it.

The side bars or strap elements 14 are formed by being cut from strip material and each has a circular opening 16 formed therein adjacent one of its ends. This circular opening 16 is chamfered, as indicated at 17, in such manner that there is provided within the opening 16 a circular collar, ring or shoulder 18 which is positioned adjacent one side surface, namely, the outside surface of the bar or strap 14, as is clearly evident in the drawings.

The ring or pad 15 resembles a thick circular washer and it includes an axial bore 19 in which a knuckle pin 12 is received, as described in detail hereinafter. Ring or pad 15 is provided with a peripheral cylindrical shouldered ledge 20 which includes as a part thereof a cylindrical circumferential portion 21 of small width that lies adjacent a chamfered portion 22 at one side of the ring or pad 15. Ring or pad 15 and the side bar or strap 14 are assembled by inserting the chamfered side or end 22 of the ring or pad 15 into the opening 16 through the outer side of bar or strap 14 and then by pressing the ring or pad 15 into the opening 16 until the ledge 20 adjacent the cylindrical circumferential portion 21 abuts the outside surface of the bar or strap 14.

Because the ring or pad 15 has a press fit in the shoulder or collar 18 in opening 16 it is retained in proper relation with the side bar or strap 14 for a subsequent fusing operation by which the ring or pad 15 and side bar or strap are made into an integral unit. When the ring or pad 15 is pressed into the opening 16 in side bar or strap 14, as above described, the chamfers 17 and 22 cooperate to provide a circular groove partly in the side bar or strap 14 and partly in the ring or pad 15 which is filled with weld or other metal which fuses the parts together, as indicated at 23 in Fig. 6 of the drawings. Upon cooling, the weld or other fusing metal is spot-faced or otherwise made flush with the inside surface of the side bar or strap 14.

The end of the side bar or strap element 14 opposite the opening 16 and ring or pad 15 is provided with an opening 24 of smaller diameter than the opening 16 and which is chamfered adjacent the outside surface of the bar or strap 14, as indicated at 25, to provide an internal collar, ring or shoulder 26. The inside surface of the side bar or strap 14 is counterbored at the opening 24 to provide a plane surface adjacent and surrounding the opening 24 and lying at right angles with respect to the axis thereof for receiving an end of the knuckle or thimble 13, as hereinafter more fully described.

The knuckle or thimble element 13 is generally cylindrical in shape and is hollow to receive a knuckle sleeve or bushing 27. Adjacent each end the knuckle or thimble 13 is provided with a shouldered ledge 28 which includes as a part thereof a cylindrical circumferential portion 29 of small width which lies adjacent a chamfered end portion 30 of the knuckle or thimble 13.

In assembling the side bar or strap elements 14 and the knuckle or thimble element 13 of each link, each chamfered end 30 of the knuckle or thimble 13 is inserted into an opening 24 through the inside surface of a side bar or strap. The side bars or straps are then positioned so that the axial bores 19 in rings or pads 15 are axially aligned, and the side straps or bars 14 are then pressed upon the knuckle or thimble 13 until the radial shoulders 28 adjacent the circumferential portions 29 of knuckle or thimble 13 abut the counterbored surface of the side bar or strap elements 14. It will be seen, of course, that because the circumferential portions 29 of knuckles or thimbles 13 are pressed into the collars, rings or shoulders 26 of the side straps 14 the proper relation between the elements 13 and 14 will be maintained during subsequent fusing operations by which the side bars or straps 14 and the knuckle or thimble 13 are made into an integral unit.

Figure 1:
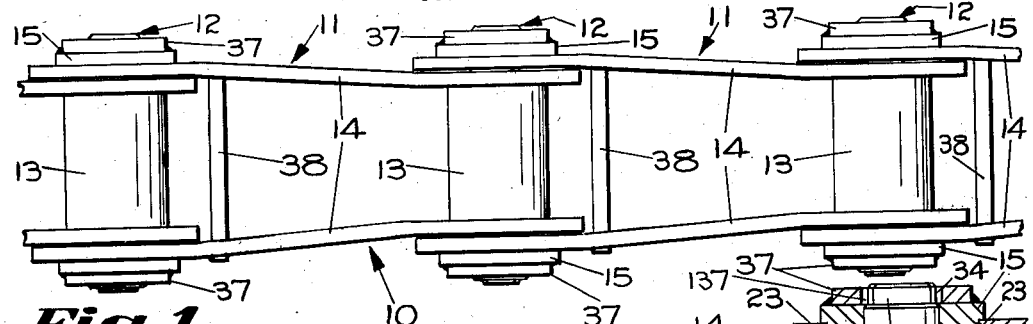
Figs. 1 and 2 are plan and side views, respectively, in elevation of a chain including features of the invention.
Figures 2, 6:
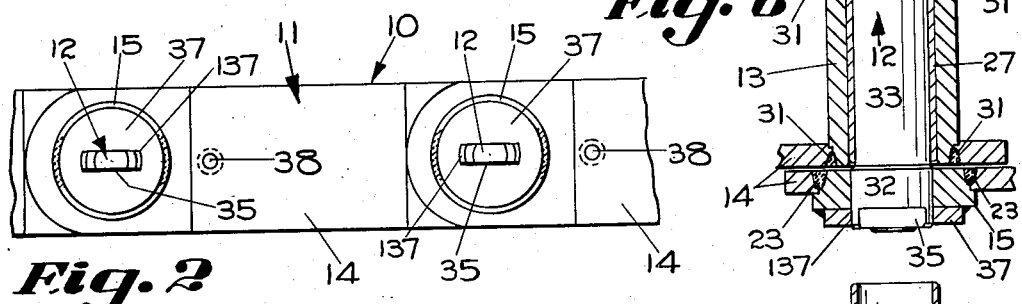
Fig. 6 is a view in section, the view being taken through the knuckle joint of two adjacent links of the chain seen in Fig. 1 and showing weld or other material fusing elements in each link of the adjacent chain links together.

When the side bars or straps 14 are pressed upon the knuckle or thimble 13, as above described, the chamfers 30 and 25 at each end of knuckle or thimble 13 cooperate to provide circular grooves partly in the side bar or strap elements 14 and partly in the knuckle or thimble 13, which grooves are filled with weld or other metal that fuses the parts together, as indicated at 31 in Fig. 6 of the drawings. Upon cooling, the weld or other fusing metal is spot-faced or otherwise made flush with the outside surface of the side straps or bars 14.

In one chain built in accordance with this invention the welds indicated at 23 and 31 are such that they penetrate entirely through the side straps 14 along the ends of the pads 15 and knuckles 13 that extend into the side strap elements.

It is very desirable that the knuckle sleeve or bushing 27 be attached to or secured within the knuckle or sleeve 13 in such manner that when the chain is in operation rotary motion of a knuckle pin therein will not cause rotation of the knuckle sleeve or bushing with respect to the knuckle of the chain link. In the past numerous devices have been employed in an effort to prevent this detrimental action, among which has been the provision of tack welds at the end or ends of the bushing and between the bushing and the knuckle or body of the chain link.

It has been found in practice that the various means heretofore provided for this purpose, including the described welds, have failed, particularly in large chains which must operate at temperatures considerably greater than ambient temperatures. In the chain herein shown and described the knuckle sleeve or bushing 27 is placed in the knuckle with a press and a shrink fit, that is, the sleeve bushing 27 has a press fit in the bore of the knuckle or thimble 13 when the knuckle or thimble is heated to a high temperature, and, of course, when the sleeve or bushing 27 is pressed into the bore of a previously heated knuckle and the knuckle cools, then the sleeve is substantially immovable in the knuckle. One advantage of this "hot press" fit is that the sleeve or bushing 27 will have at least a press fit with the knuckle when the chain in operating at elevated temperature.

From the foregoing description taken in connection with the drawings it will be seen that the body of each chain link 11, when viewed in plan, is of U-shape and that the chain 10 is assembled by placing the offset free ends of the side bars or straps 14 over the closed or knuckle end of an adjacent chain link body and by inserting one of the knuckle pins 12 through the bores 19 in the rings or pads 15 of the side bars or straps 14 of one chain link and through the knuckle 13 and bushing 27 of the adjacent link. It is important to note that the knuckle pin 12 (see Fig. 4) is not of uniform diameter. Actually the knuckle pin 12 is a cylinder having portions of three different diameters, namely, an end portion 32 having one diameter, a central or bearing portion 33 having a smaller diameter, and an end portion 34 having a still smaller diameter.

It is also to be noted that the knuckle pin 12 is made, as by straddle milling operations, to include across its end 32 a flat axially extending tongue 35 and a second tongue 36 at its end 34. Tongues 35 and 36 have identical thicknesses. Their widths, of course, are determined by the diameters of the portions 32 and 34 and their lengths are slightly greater than the thickness of the side bar or strap elements 14 for reasons which will become obvious from the following description.

The diameter of the axial bore 19 in one of the rings or pads 15 is such that it will have a press fit with the large diameter portion 32 of knuckle pin 12, and the other ring or pad 15 of each chain link 11 has an axial bore 19 of such diameter that it has a press fit with the small diameter end portion 34 of pin 12. The central portion 33 of pin 12 has a free fit with bushing 27. Thus when adjacent links 11 of chain 10 are to be connected the small diameter end portion 34 of pin 12 may be inserted through the ring or pad 15 having the larger diameter, and the pin may be pushed through the bushing 27 in knuckle or thimble 13 until both the large and small diameter end portions 32 and 34 of pin 12 start to enter the bores 19 in rings or pads 15, after which considerable force is required to press the pin through the side bars or straps 14 to the position shown in Fig. 6 of the drawings.

Rotation and endwise movement of the knuckle pin 12 within the rings or pads 15 is prevented by a pair of identical disk-like keepers 37 that are slotted as indicated at 137. A keeper 37 is heated and placed on that portion of each of the tongues 35 and 36 that project laterally of the rings or pads 15 and when the keepers cool the slots 137 thereof have a shrink fit with the opposite side surfaces of the tongues. The keepers 37 are then welded at their edges to the rings or pads 15. These keepers 37 may be made from the disks of material removed from the side bar or strap elements 14 when the openings 16 are formed therein.

In order to assist in preventing the ends of the side bar or strap elements 14 of the fabricated chain link from spreading and possibly slipping off the ends of the knuckle pin 12, the side strap elements 14 are tied together by a rod or pin 38 that extends through and between the side bars or strap elements 14 of each link. At one end rod or pin 38 is provided with a head 39 that seats in one of the side strap elements 14, and the other end of rod or pin 38 is welded to the other side bar 14.

The particular chain link shown in Fig. 3 of the drawings has a plurality of openings 40 formed in one of its side bars or straps 14 through which rivets or bolts may be inserted to attach buckets, or the like, to the chain.

From the foregoing description of the structure of each of the chain links 11 which are combined to form the chain 10, it will be seen that each chain link 11 is fabricated from a plurality of elements that are fused to form an integral unit wherein the various elements may be of different metals or alloys which, when combined as above described, cooperate to provide maximum strength for any given amount of material in the chain link. For example, the side bar elements of such chain links may be made relatively large in cross-section and because they are subjected to little wear they may be made of a less expensive material, such as Croloy hot rolled fully annealed steel, which will have adequate strength to withstand the tension loads to which they are subjected. It will be seen, of course, that where the cross-sectional area of a side bar or strap is reduced by the openings therein that receive the knuckle and pin boss that the strength of the side bar or strap is reduced adjacent the openings, but since the bosses and knuckle may be and preferably are made of a material, such as hot rolled fully annealed steel, having a greater strength than that of the side bar or strap, these elements when fused into the side strap or bar compensate for the loss in strength in the side bar by reason of the metal previously removed therefrom to accommodate the knuckle and pin boss. The weld or fusion metal employed must be compatible with the metal or alloy that forms the bosses and knuckles, as well as with the metal or alloy that forms the side bars or straps, and it should also be a material, such as Unionmelt rod lines #40 and #80 melt, which in itself has a strength equal at least to the strength of the side bar or strap elements.

While the present invention may be employed in chains of various sizes to be used for diverse purposes, it may be employed with particular advantage in chains that are required to operate at temperatures ranging up to 1000° F., or more. Chains are required to operate at such temperatures in enclosed hot catalyst elevators now employed in the process of cracking hydrocarbons, and such elevators frequently have a height in the neighborhood of 175 ft. or more and require chain links which have a center to center distance between their knuckle pins in the neighborhood of 24 inches.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A chain particularly adapted to operate at elevated temperatures including a plurality of links, each link including two spaced opposite side strap elements each including a bore adjacent each of the ends thereof, a knuckle having an axial bore and extending into the bores adjacent one end of said side strap elements, weld material permanently fusing said knuckle and said side strap elements, a bushing in said knuckle bore having a shrink fit therein when said chain is at ambient temperature, means forming a pad on each of said side strap elements including a portion projecting into the other of said bores in said side strap elements, each pad having a bore, weld material permanently fusing said projecting pad portions and said side strap elements, said last named bores in the pads being of different diameters and lying substantially upon a common axis, stepped pins interconnecting adjacent links of said chain, said pins each having three different outside diameters and shouldered means projecting axially at its ends, each of said pins extending through the pads of one link and the knuckle and bushing of another link and having a shrink fit with said pads and a non-shrink fit with said bushing when said chain is at ambient temperature, keeper means at the opposite ends of said pins having a shrink fit on said shouldered projection when said chain is at ambient temperature, and weld means securing said keeper means to said pads.

2. A chain particularly adapted to operate at elevated temperatures including a plurality of links, each link including two spaced opposite side strap elements each including a bore adjacent each of the ends thereof, a knuckle having an axial bore and extending into the bores adjacent one end of said side strap elements, weld material permanently fusing said knuckle and said side strap elements, means forming a pad on each of said side strap elements including a portion projecting into the other of said bores in said side strap elements, each pad having a bore, weld material permanently fusing said projecting pad portions and said side strap elements, said last named bores in the pads being of different diameters and lying substantially upon a common axis, pins interconnecting adjacent links of said chain, said pins each having different outside diameters and shouldered means projecting axially at its ends, each of said pins extending through the pads of one link and the knuckle of another link and having a shrink fit with said pads when said chain is at ambient temperature, keeper means at the opposite ends of said pins having a shrink fit on said shouldered projections when said chain is at ambient temperature, and weld means securing said keeper means to said pads.

3. A chain particularly adapted to operate at elevated temperatures including a plurality of links, each link including two spaced opposite side strap elements each including a bore adjacent each of the ends thereof, a knuckle having an axial bore and extending into the bores adjacent one end of said side strap elements, weld material permanently fusing said knuckle and said side strap elements, means forming a pad on each of said side strap elements including a portion projecting into the other of said bores in said side strap elements, each pad having a bore, weld material permanently fusing said projecting pad portions and said side strap elements, said last named bores in the pads lying substantially upon a common axis, pins interconnecting adjacent links of said chain, said pins each having shouldered means projecting axially at its ends, each of said pins extending through the pads of one link and the knuckle of another link and having a shrink fit with said pads when said chain is at ambient temperature, keeper means at the opposite ends of said pins having a shrink fit on said shouldered projections when said chain is at ambient temperature, and weld means securing said keeper means to said pads.

4. A chain including a plurality of links, each link including two spaced opposite side strap elements each including a bore adjacent each of the ends thereof, a knuckle having an axial bore and extending into the bores adjacent one end of said side strap elements, weld material permanently fusing said knuckle and said side strap elements, means forming a pad on each of said side strap elements including a portion projecting into the other of said bores in said side strap elements, each pad having a bore, weld material permanently fusing said projecting pad portions and said side strap elements, said last named bores in the pads lying substantially upon a common axis, pins interconnecting adjacent links of said chains, said pins extending through the pads of one link and the knuckle of another and having a shrink fit with said pads, keeper means at the opposite ends of said pins, and weld means securing said keeper means to said pads.

5. A chain including a plurality of links, each link including two spaced opposite side strap elements each including a bore adjacent each of the ends thereof, a knuckle having an axial bore and extending into the bores adjacent one end of said side strap elements, weld material permanently fusing said knuckle and said side strap elements, means forming a pad on each of said side strap elements including a portion projecting into the other of said bores in said side strap elements, each pad having a bore, weld material permanently fusing said projecting pad portions and said side strap elements, said last named bores in the pads lying substantially upon a common axis, and pins interconnecting adjacent links of said chains, said pins extending through the pads of one link and the knuckle of another link.

6. A chain including a plurality of links, each link including two spaced opposite side strap elements each including a bore adjacent each of the ends thereof, a knuckle having an axial bore interconnecting said side strap elements, means forming a pad on each of said side strap elements including a portion projecting into the other of said bores in said side strap elements, each pad having a bore, weld material permanently fusing said projecting pad portions and said side strap elements, said last named bores in the pads lying substantially upon a common axis, pins interconnecting adjacent links of said chains, said pins extending through the pads of one link and the knuckle of another link, keeper means at the opposite ends of said pins, and weld means securing said keeper means to said pads.

7. A chain including a plurality of links, each link including two spaced opposite side strap elements each including a bore, a knuckle having an axial bore, means forming a pad on each of said side strap elements including a portion projecting into said bore in said side strap elements, each pad having a bore, weld material permanently fusing said projecting pad portions and said side strap elements, said last named bores in the pads lying substantially upon a common axis, and pins interconnecting adjacent links of said chains, said pins extending through the pads of one link and the knuckle of another link.

References Cited in the file of this patent

UNITED STATES PATENTS

| | | |
|---|---|---|
| 2,012,947 | Bosnian | Sept. 3, 1935 |
| 2,159,396 | Miller et al. | May 23, 1939 |
| 2,582,057 | Mueller | Jan. 8, 1952 |

FOREIGN PATENTS

| | | |
|---|---|---|
| 270,153 | Switzerland | Aug. 15, 1950 |